United States Patent [19]
Henshaw

[11] Patent Number: 6,040,833
[45] Date of Patent: Mar. 21, 2000

[54] METHOD AND SYSTEM FOR DISPLAY MANIPULATION OF MULTIPLE APPLICATIONS IN A DATA PROCESSING SYSTEM

[75] Inventor: Susan F. Henshaw, Cary, N.C.

[73] Assignee: International Business Machines Corp., Armonk, N.Y.

[21] Appl. No.: 08/165,430

[22] Filed: Dec. 10, 1993

[51] Int. Cl.[7] .................................................. G06F 3/14
[52] U.S. Cl. .......................................... 345/344; 345/326
[58] Field of Search ..................................... 395/158, 157, 395/160, 164, 500, 600, 800; 364/419.19, 943, 222.9, 221.4

[56] References Cited

U.S. PATENT DOCUMENTS

| | | | |
|---|---|---|---|
| 4,982,344 | 1/1991 | Jordan | 395/157 |
| 5,050,105 | 9/1991 | Peters . | |
| 5,257,185 | 10/1993 | Farley et al. | 395/600 X |
| 5,291,587 | 3/1994 | Kodosky et al. | 395/157 X |
| 5,301,336 | 4/1994 | Kodosky et al. | 395/800 |
| 5,335,323 | 8/1994 | Kolnick | 395/164 |
| 5,412,776 | 5/1995 | Bloomfield et al. | 395/160 |

OTHER PUBLICATIONS

Research Disclosure No. 348, Apr. 1993, Havant GB, p. 270, Disclosure No. 34879: "Graphical Window List System".

IBM Technical Disclosure Bulletin, vol. 36, No. 5, May 1993, New York US, pp. 381–382, "Simple Method of Directly Accessing Stacked Workstations".

European Search Report, App. No. EP 94 48 0119, Feb. 2, 1995, A. Fonderson, The Hague.

Primary Examiner—Ruay Lian Ho
Attorney, Agent, or Firm—Gregory M. Doudnikoff

[57] ABSTRACT

A method and system for manipulating the display of multiple software applications within a data processing system which are displayed within multiple windows which at least partially overlap in a selected order from a bottom position to a top position. A depth control window is displayed within the data processing system in response to a user input. The depth control window includes multiple graphic elements arranged in the selected order wherein each graphic element corresponds to a software application window within the data processing system. The display of software application windows within the data processing system is then altered, in response to a user selection of a particular graphic element, to display a particular application window which corresponds to the selected graphic element and each window which is overlapped by the window displaying the particular application. In this manner, the user may efficiently "dive" to a selected depth within an overlapping stack of windows and effectively eliminate from the display those windows which are "above" the selected window, without rearranging the hierarchical order of the windows. The depth control window also includes graphics controls which permit a user to alter the graphic appearance of a selected window within the data processing system.

21 Claims, 7 Drawing Sheets

METHOD AND SYSTEM FOR DISPLAY MANIPULATION OF MULTIPLE APPLICATIONS IN A DATA PROCESSING SYSTEM

BACKGROUND OF THE INVENTION

1. Technical Field

The present invention relates in general to an improved data processing system and in particular to an improved method and system for controlling and manipulating the display of multiple applications within a data processing system. Still more particularly, the present invention relates to a graphic method and system for manipulating and accessing the display of multiple applications which are displayed in overlapping windows within a data processing system.

2. Description of the Related Art

Recent data processing systems include operating systems which allow users to simultaneously access, display and manipulate data from a variety of related and/or unrelated computer application programs. While only one application is in fact active at any one time, the user interface of such modern operating systems presents multiple applications to the user via a display. Activity relating to each application is typically displayed in a viewport or "window." Depending upon their number and size, these windows may overlap each other either partially or completely and may obscure various applications in that manner. This is known as the "messy desk" scenario. The user may, at his or her own option, work with data in any of the open windows by altering which window contains the active work area. Examples of windowing programs include Windows™ published by Microsoft Corporation and DeskQView™ published by QuarterDeck Office Systems. Both of these windowing systems will operate on the International Business Machines Corporation Personal System 2 (PS/2) series of personal computers.

There are, however, certain inherent problems in most such windowing systems. In order to access the application or data which a user desires to manipulate, the user must activate the window which contains the desired application or data. In a "messy desk" scenario, it often takes a substantial amount of time to sort through the various windows to reach the appropriate application. In this process, the user must move and/or minimize multiple windows, thereby affecting the hierarchical integrity of the desktop. After such rearrangement of the windows, the hierarchical arrangement of the applications within the system may have been radically altered. Also, the user faces a loss of time due to the number of keystrokes necessary simply to obtain a visual image of the ultimate object data and due to the time necessary for the system to respond to the different commands entered by the user. Furthermore, the user's job is made even more difficult due to the necessity of remembering a multiplicity of different interface and access procedures for different application programs and for different levels within the same application program.

Certain application programs have attempted to solve these problems but have generally done so at the expense of various desirable features. For example, the HyperCard program of Apple Computer, discussed at length in *The Complete Hypercard Handbook* by Denny Goodman, Bantam Books 1987, provides a simple means for avoiding a predetermined organization scheme when accessing object data, allowing direct linking and various disparate types of data at the user's command via activation of a "button." Although this program provides a uniform, simple and relatively swift method of interfacing between different types of data which may be stored in completely different formats, it suffers from an inability to display more than one type of object data at a time on the display screen and from a requirement for an enormous amount of resident memory and static storage capacity to function properly. Moreover, this program is designed to be a tool kit enabling users to design their own permanent links between data, thereby creating new applications, rather than a program for providing swift access to levels of data within other pre-existing application programs which are not otherwise interconnected.

Another approach known in the art is a utility program published by SoftLogic Solutions as SoftCarousel. This program permits up to ten different application programs or data files to be loaded and allows a user to move from one application to another with a single keystroke. The utility requires configuration by the user and is not a universal solution for the problem.

More recently, U.S. Pat. No. 5,050,105 discloses a direct cursor-controlled access technique whereby multiple application programs and data may be accessed by a user. This patent discloses a so-called "exploding" cursor function which permits a plurality of windows to be linked in an arbitrary sequence to form a chain when the exploding cursor function has been activated and the sequential displaying of each of those windows in response to user inputs utilizing the exploding cursor.

Upon reference to the foregoing those skilled in the art will appreciate that a graphic method and system for accessing multiple applications which are displayed within multiple overlapping windows would be highly desirable.

SUMMARY OF THE INVENTION

It is therefore one object of the present invention to provide an improved data processing system.

It is another object of the present invention to provide an improved method and system in a data processing system for improving access to multiple applications in a "messy desk" scenario.

It is yet another object of the present invention to provide a graphic method and system for manipulating the display of multiple applications which are displayed in overlapping windows within a data processing system.

It is still another object of the present invention to provide a variable "depth control" within a plurality of overlapping windows.

The foregoing objects are achieved as is now described. The method and system of the present invention may be utilized to manipulate the display of multiple software applications within a data processing system which are displayed within multiple windows which at least partially overlap in a selected order from a bottom position to a top position. A depth control window is displayed within the data processing system in response to a user input. The depth control window includes multiple graphic elements arranged in the selected order wherein each graphic element corresponds to a software application window within the data processing system. The display of software application windows within the data processing system is then altered, in response to a user selection of a particular graphic element, to display a particular application window which corresponds to the selected graphic element and each window which is overlapped by the window displaying the particular application. In this manner, the user may efficiently "dive" to a selected depth within an overlapping stack of windows and effectively eliminate from the display those windows which are "above" the selected window, without rearranging the hierarchical order of the windows. The depth control window also includes graphics controls which permit a user to alter the graphic appearance of a selected window within the data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
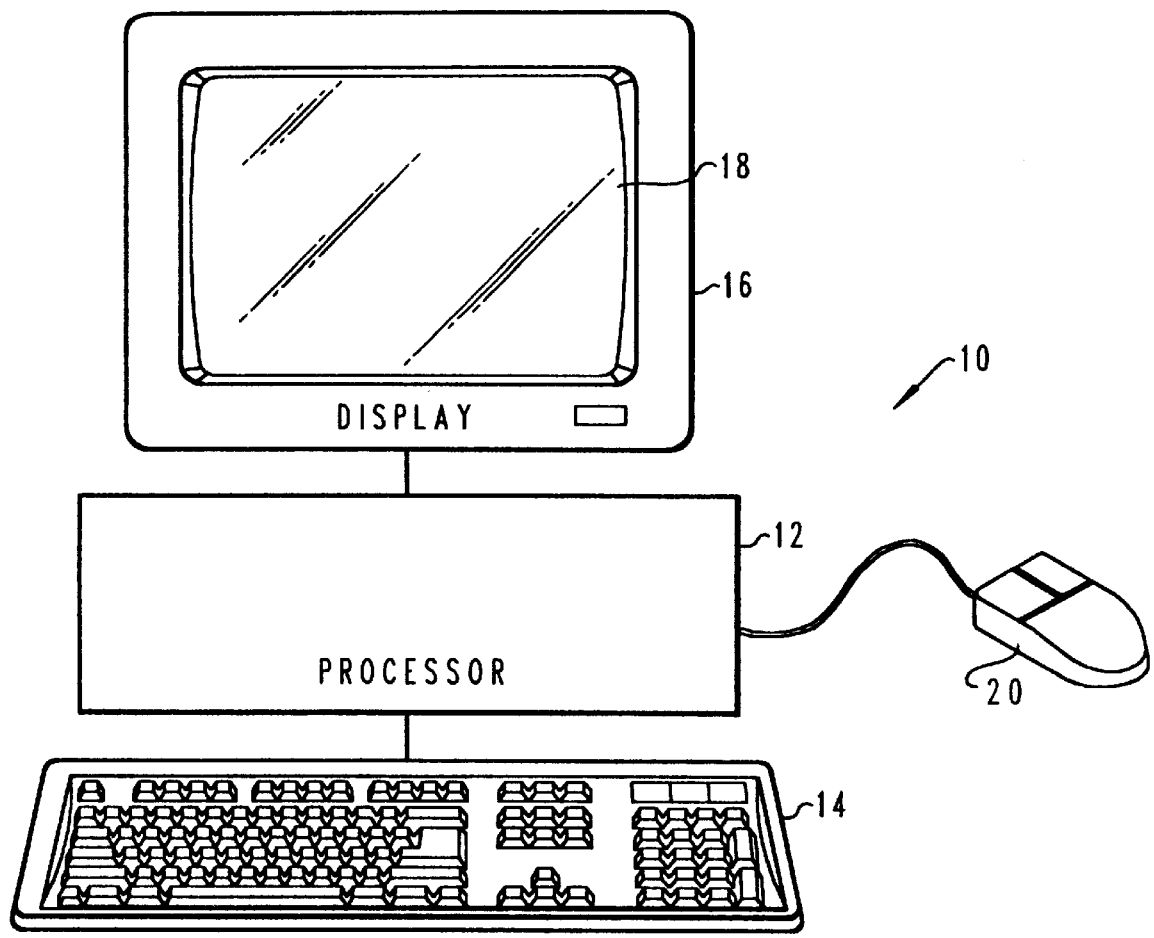
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As illustrated, data processing system 10 includes a processor 12 and a keyboard 14. As is typical in such data processing systems, a display device 16 is also coupled to processor 12 and includes a display screen 18. A graphic pointing device 20, such as a mouse pointer, is also coupled to processor 12 and may be utilized, as those skilled in the art will appreciate, to graphically select an element within display screen 18 in a manner well known in the art. Data processing system 10 may be implemented utilizing any so-called "personal" computer, such as the International Business Machines Corporation PS/2 personal computer.

As those skilled in the art are well aware, the present invention will most often be embodied in computer readable code, also known as computer software. The block diagram and flow charts further describe the logical steps carried out by a computer executing software having techniques according to the present invention coded therein. Software program code is typically stored in the memory of a standalone workstation or as a computer environment. The software program code may be embodied on any of a variety of known media, such as diskette or CD-ROM, for use with a data processing system. The software program code may be distributed on such media, or may be distributed to users from the memory of one computer system, over a network of some type, to other computer systems for use by users of such other systems. Such techniques and methods for embodying software code on media and/or distributing software code are well known, and will not be further discussed herein.

Figure 2:
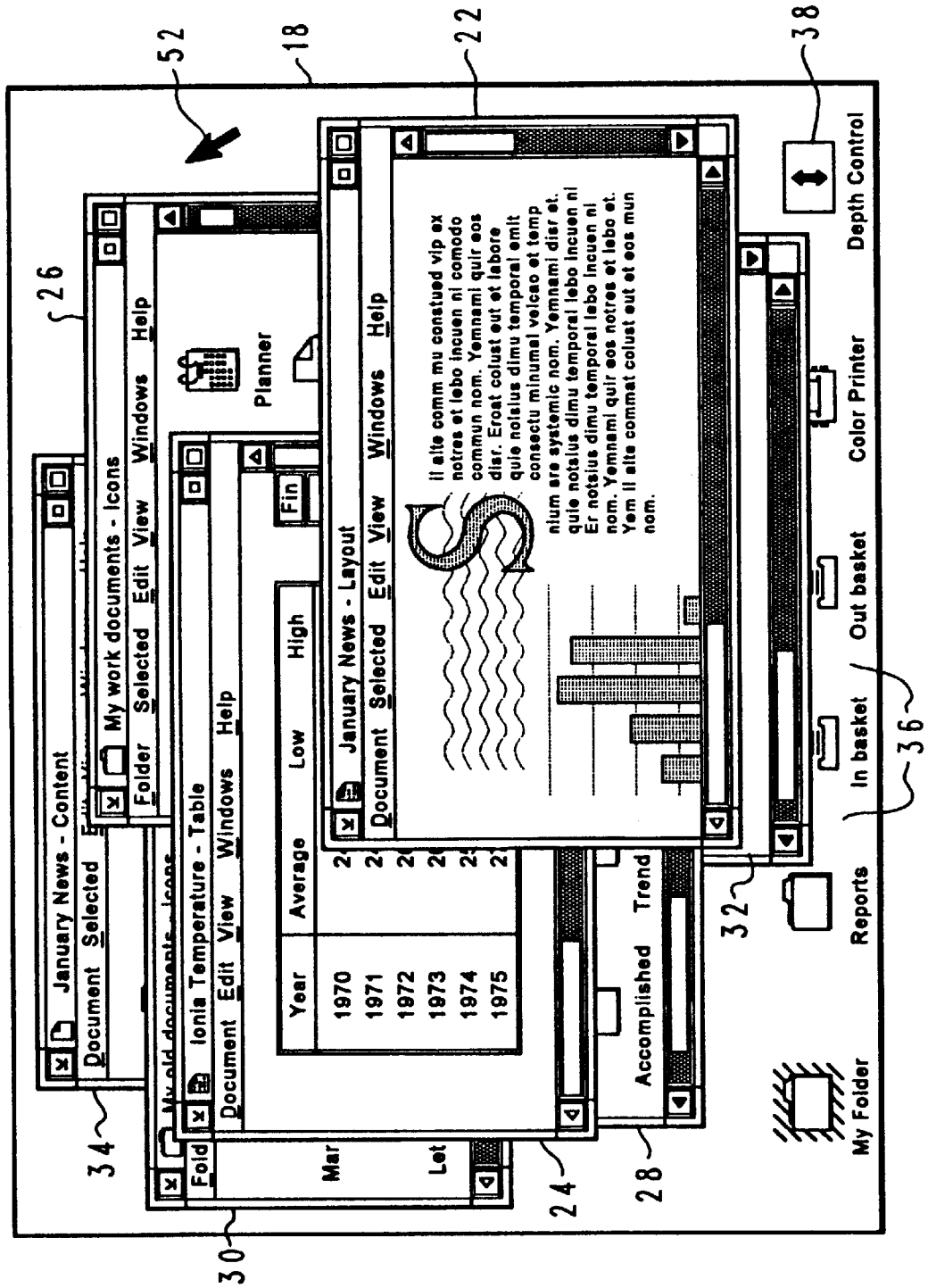
FIG. 2 is a pictorial representation of the display of multiple applications within overlapping windows displayed via a graphic user interface within the data processing system of FIG. 1.

Referring now to FIG. 2, there is depicted a pictorial representation of a graphic user interface which is active on display screen 18 which includes multiple applications which are active within the data processing system 10 and displayed within overlapping windows within display device 16. As illustrated, window 22 displays an application entitled "January News-Layout." Similarly, window 24 illustrates "Ionia Temperature-Table." Additional applications are displayed within windows 26, 28, 30 and 32 which display applications entitled "My work documents-Icons"; "Sue's data-Icons"; "My old documents-Icons"; "New Car Lot-Icons"; and "January News-Content," respectively. Window 32 is not visible within FIG. 2.

Also depicted within display screen 18 is icon layer 36 which includes graphic displays of various icons representative of applications which are currently minimized or "tokenized" to the iconic state. A Depth Control icon 38 is also illustrated and may be selected graphically, utilizing mouse pointer 52, to open a depth control window which may be utilized to alter the display of multiple overlapping applications in a manner which will be explained in greater detail herein.

Figure 3:
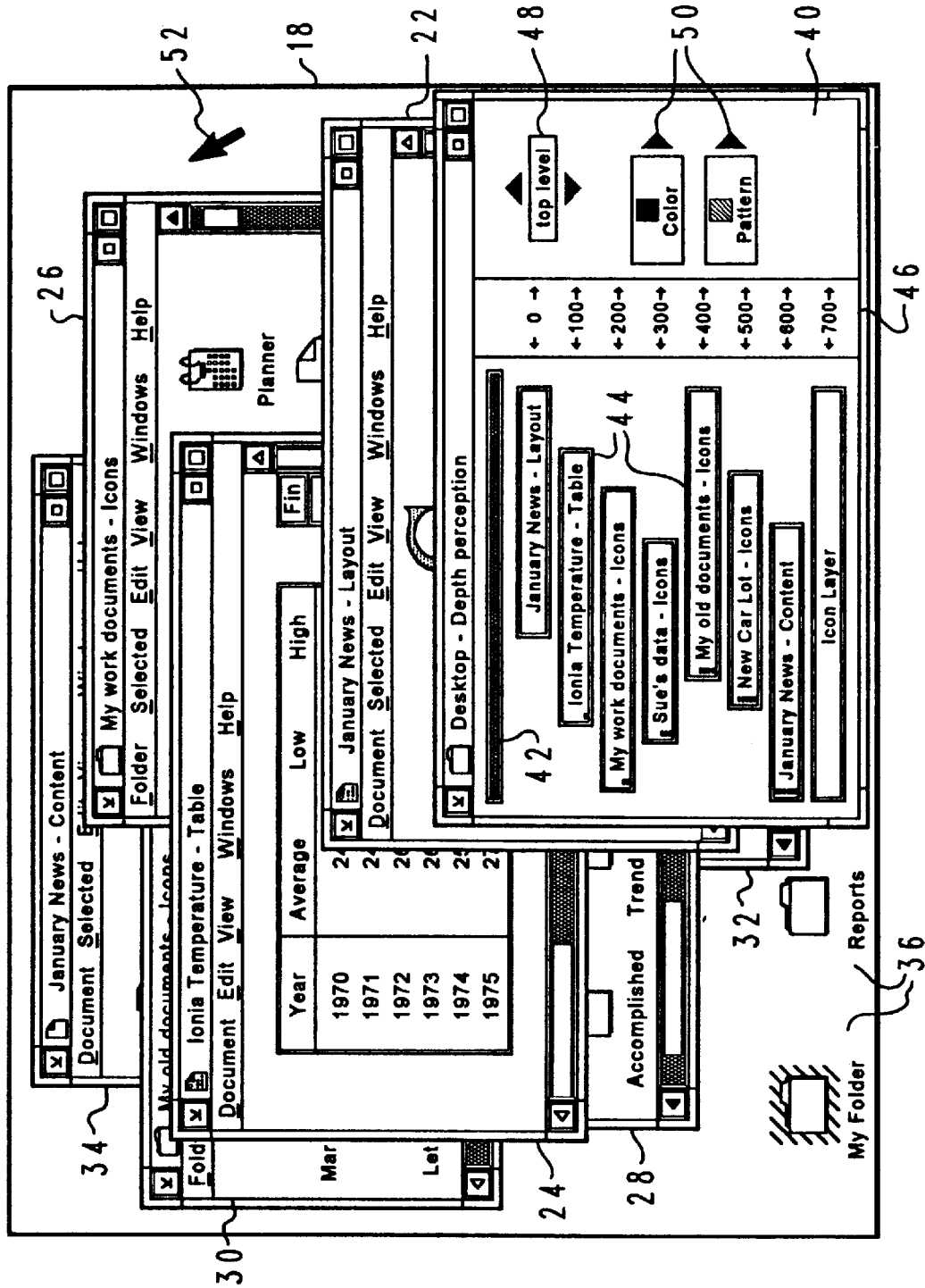
FIG. 3 is a pictorial representation of the display of multiple applications within overlapping windows and a depth control window which is provided in accordance with the method and system of the present invention.

With reference now to FIG. 3, there is depicted a pictorial representation of the display of multiple applications within overlapping windows and a depth control window which is provided in accordance with the method and system of the present invention. Upon the selection of depth control icon 38 of FIG. 2 utilizing mouse pointer 52, a depth control window 40 is displayed within display screen 18. Depth control window 40 includes a depth indicator 42 and a plurality of title bars 44, which are displayed in a vertical column which is representative of the relative display position of each window within display screen 18. Depth indicator 42 and depth indicia 46 are preferably dynamically updated each time depth control icon 38 is selected by determining which windows are open and the relative "depth" of each window. The current position of the user within the "stack" of windows is also dynamically determined and utilized to position depth indicator 42, since a title bar 44 will be displayed within depth control window 40 for each window, whether or not that window is currently displayed. Also depicted within depth control window 40 are depth indicia 46 which provide a numeric indication of the relative depth of each application displayed within a window within display screen 18. Alteration of the display within display screen 18 may be accomplished in accordance with the method and system of the present invention utilizing one of several techniques. For example, mouse pointer 52 may be utilized to select a particular title bar from the column of title bars 44. The apparent depth of a user within the overlapping list of windows within display screen 18 will then be automatically altered to the position selected by the user. This may also be accomplished by selecting depth indicator 42 and altering the position thereof utilizing so-called "drag and drop" techniques.

Additionally, in the depicted embodiment of the present invention illustrated herein, a spin button 48 is provided within depth control window 40 and the position of depth indicator 42 within depth control window 40 may be altered by a selection of spin button 48 utilizing mouse pointer 52 in a manner well known to those having ordinary skill in the graphic user interface arts. Finally, graphics controls 50 are also provided and may be utilized to alter the color and/or pattern of a particular window as desired by the user.

Figure 4:
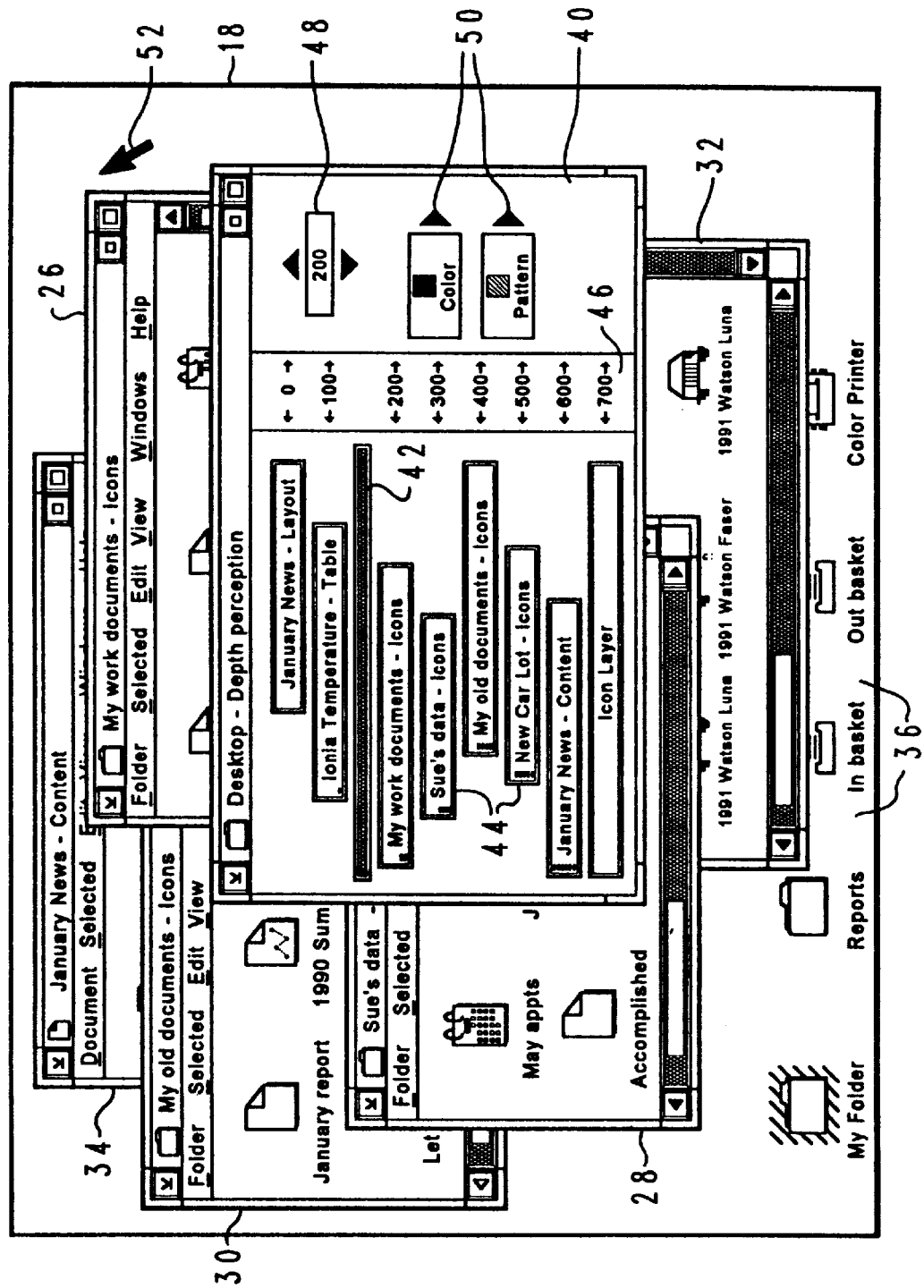
FIG. 4 is a pictorial representation of a display of multiple applications within overlapping windows which has been altered utilizing the depth control window provided in accordance with the method and system of the present invention.

Referring now to FIG. 4, there is depicted a pictorial representation of a display of multiple applications within overlapping windows which has been altered utilizing depth control window 40 in a manner described above. By altering the position of depth indicator 42 utilizing spin button 48, a "drag and drop" technique or by selecting title bar 44 associated with "My work documents-Icons," the display within display screen 18 has been altered to display window 26 and only those remaining windows which are overlapped by window 26. That is, those windows which are displayed beneath window 26 in the display of FIG. 3. In this manner the visual perspective of the user is altered by permitting the user to "dive" to a selected depth within the overlapping windows.

In this manner those skilled in the art will appreciate that by utilizing depth control window 40 in the manner set forth within the present application a user may directly and efficiently access particular applications which are displayed within one of many overlapping windows within display screen 18, even though a particular application may be totally obscured by other windows prior to its selection.

Figure 5:
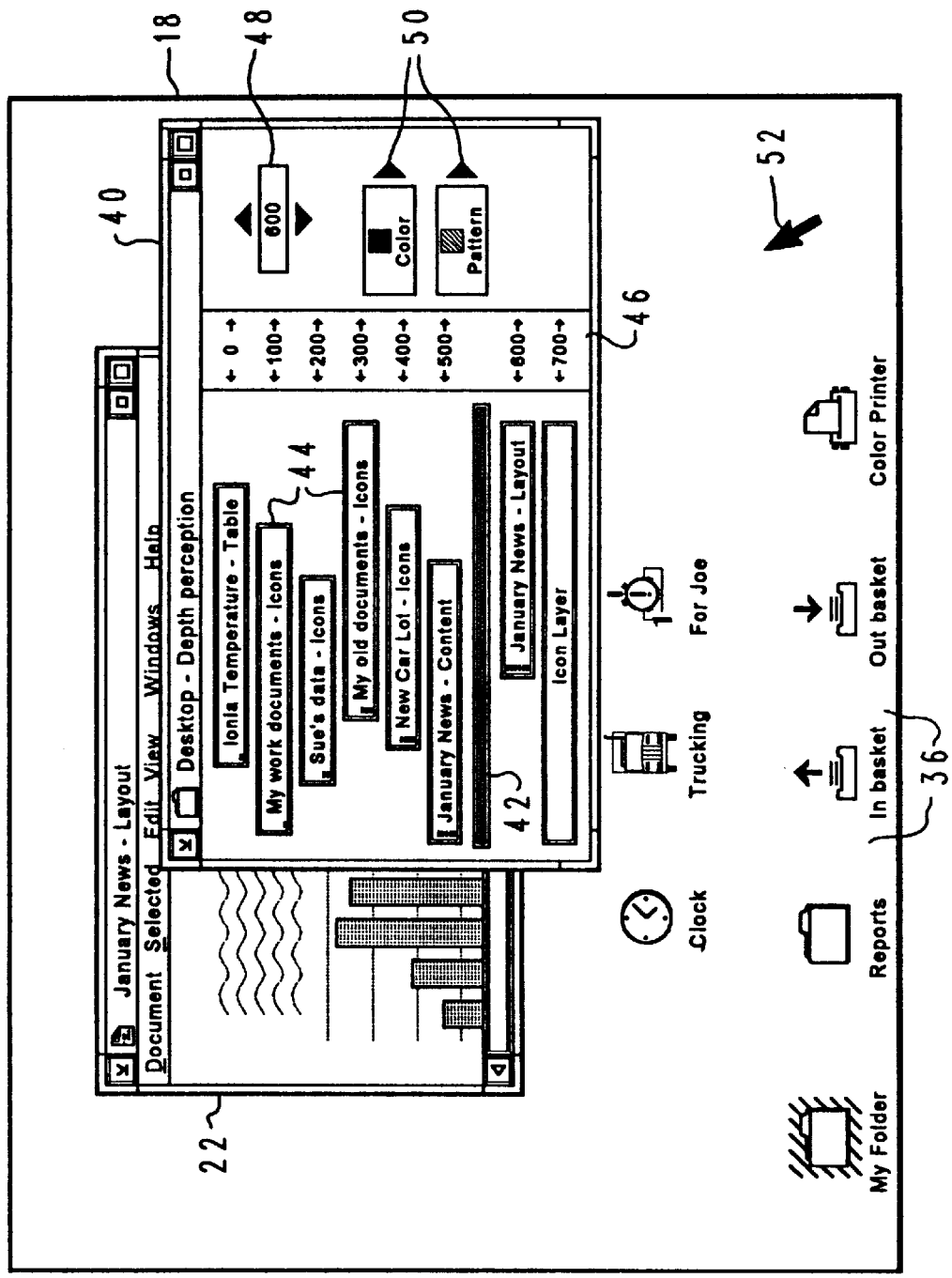
FIG. 5 is a display of multiple applications within overlapping windows which have been altered a second time utilizing the depth control window provided in accordance with the method and system of the present invention.

With reference now to FIG. 5, there is depicted a pictorial representation of display screen 18 which has been altered yet again utilizing depth control window 40. As illustrated within FIG. 5, title bar 44 associated with window 22 has been graphically relocated to a position below all other title bars within the column of title bars within depth control window 40. This is accomplished utilizing well known "drag and drop" techniques and has resulted in window 22 being displayed at the lowest point within the simulated three-dimensional display. Depth indicator 42 has been moved to a position above this title bar and thus, as illustrated within FIG. 5, only window 22 is displayed within display screen 18. Of course, as those skilled in the graphic user interface art will appreciate, once the contents of display screen 18 have been altered as desired, depth control window 40 may be closed or "tokenized" and displayed as an icon.

Figure 6:
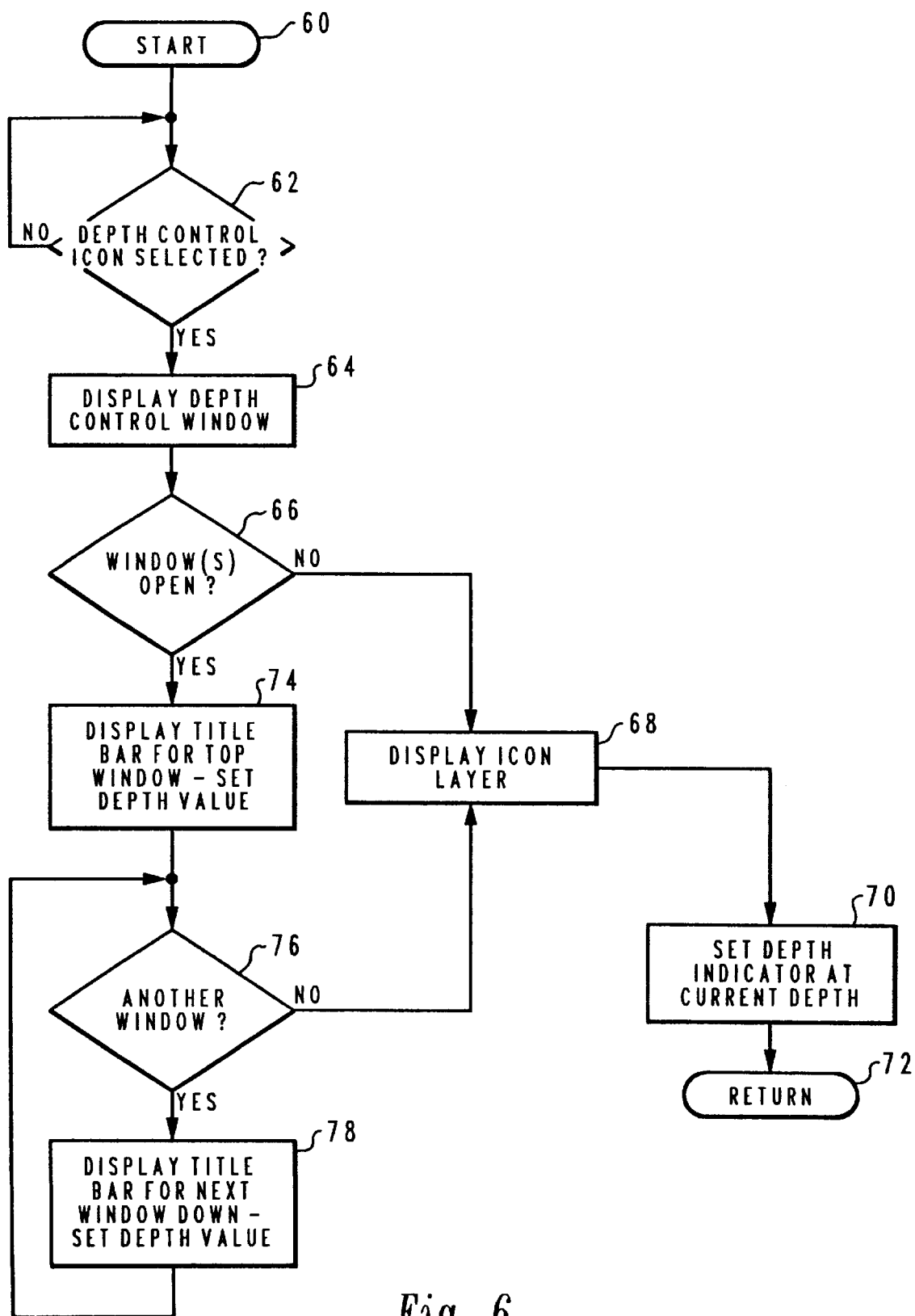
FIG. 6 is a high level logic flowchart illustrating the creation and display of a depth control window in accordance with the method and system of the present invention.

Referring now to FIG. 6, there is depicted a high level logic flowchart which illustrates the creation and display of a depth control window in accordance with the method and system of the present invention. As illustrated, this process begins at block 60 and thereafter passes to block 62 which illustrates a determination of whether or not the depth control icon has been selected within the graphic user interface. If not, this process merely iterates until such time as the depth control icon has been selected. However, once the depth control icon has been selected, the process passes to block 64.

Block 64 illustrates the creation and displaying of depth control window 40 (see FIG. 3) and the process then passes to block 66. Block 66 illustrates a determination of whether or not any windows are "open" within graphic user interface displayed within display screen 18. If not, the process passes to block 68 which illustrates the displaying of a title bar illustrative of icon layer 36 within the depth control window at the bottom "depth" of the display. Next, the depth indicator is set at the current depth, as indicated at block 70 and the process then passes to block 72 and returns to await further input from the user.

Referring again to block 66, in the event one or more windows within the graphic user interface within the display are open, whether or not those windows are currently displayed at the current "depth" of the user, the process passes to block 74. Block 74 illustrates the displaying of the title bar which corresponds to the top window within the depth control window and the setting of a depth value for that title bar. As illustrated within FIGS. 3, 4, and 5, the depth value is preferably a numeric indicia representative of the relative depth of a particular window within the simulated three-dimensional display of multiple overlapping windows which is provided utilizing graphic user interface within the display screen 18.

Next, the process passes to block 76. Block 76 illustrates a determination of whether or not a second window is open. If not, the process passes to block 68 which illustrates the displaying of the title bar illustrative of the icon layer below the title bar which corresponds to the open window. Next, the process passes to block 70 which illustrates the setting of the depth indicator at the current depth of the user, as depicted in block 70. The process then passes to block 72 and returns to await further input from the user.

Referring again to block 76, in the event a second or subsequent window is open within the graphic user interface within display screen 18, the process passes to block 78. Block 78 illustrates the displaying of a title bar which corresponds to the next window down within the multiple overlapping windows and the setting of a depth value for that title bar. Thereafter, the process returns, in an iterative fashion, to block 76 to determine whether or not another window is open within display screen 18. Once title bars which correspond to all open windows have been created and displayed within the depth control window, and the icon layer has been displayed, the process passes to block 70 and returns to await further input from the user.

Of course, if the number of title bars corresponding to open windows exceeds the number which may be displayed within the depth control window a continuation window may be created and displayed or a scroll bar may be utilized to scroll through the display of title bars. Additionally, while the above process describes the creation and display of the title bars from the top down, those skilled in the art will appreciate that the title bars may be crated from the bottom up.

Figure 7:
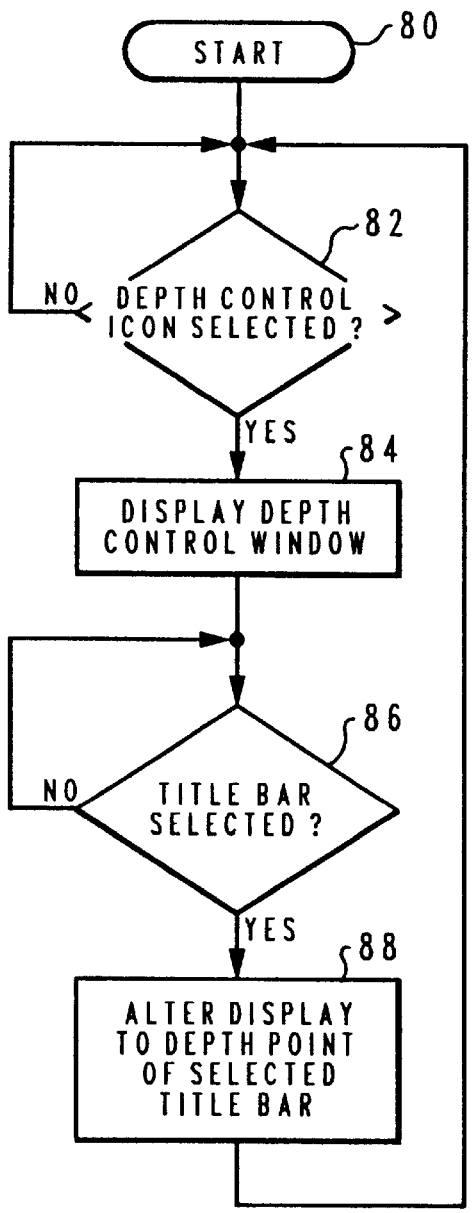
FIG. 7 is a high level logic flowchart illustrating the manipulating of the display of multiple applications in accordance with the method and system of the present invention.

With reference now to FIG. 7, there is depicted a high level logic flowchart which illustrates the manipulating of the display of multiple applications which are displayed in a plurality of overlapping windows in accordance with the method and system of the present invention. As depicted, this process begins at block 80 and thereafter passes to block 82. Block 82 illustrates a determination of whether or not the depth control icon has been selected and if not, the process merely returns in an iterative fashion to await the selection of the depth control process. Once the depth control icon has been selected, the process passes to block 84. Block 84 illustrates the displaying of depth control window 40 as depicted in FIGS. 3, 4 and 5.

Next, the process passes to block 86. Block 86 illustrates a determination of whether or not a title bar has been selected within depth control window 40. As described above, the selection of a title bar may comprise the graphic selection of a title bar utilizing a mouse pointer, the "drag and drop" of the depth indicator to a position above a particular title bar or the movement of the depth indicator utilizing spin button 48. If a title bar has not been selected, the process merely iterates until such time as the user elects to alter the display within display screen 18 utilizing the depth control window in the manner described above. Once a title bar has been selected, the process passes to block 88. Block 88 illustrates the altering of the display within display screen 18 to a depth point above the window which corresponds to the selected title bar, in the manner illustrated herein.

Figure 8:
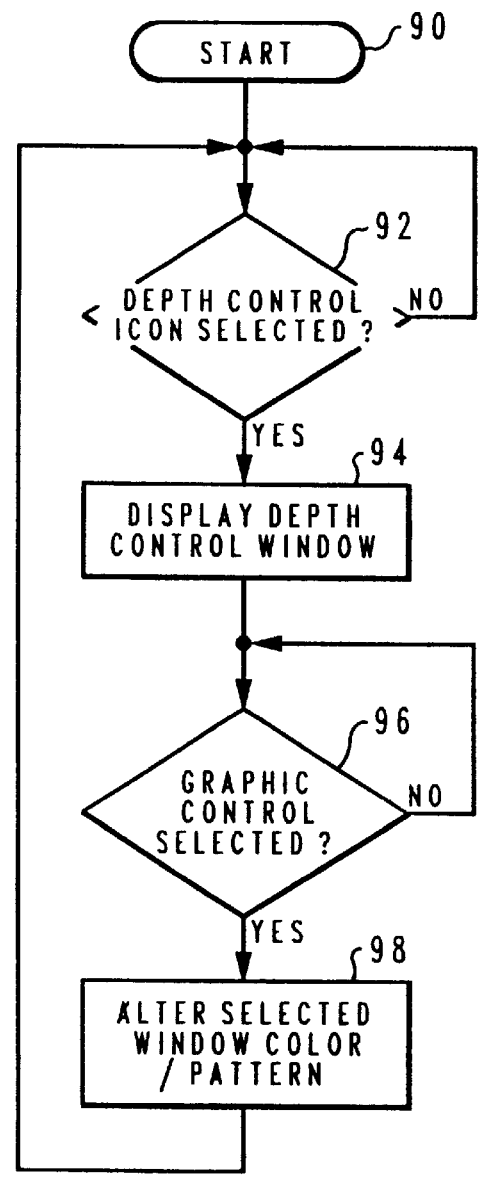
FIG. 8 is a high level logic flowchart illustrating the manipulation of the graphic appearance of a window in accordance with the method and system of the present invention.

Finally, with reference to FIG. 8, there is depicted a high level logic flowchart which illustrates the manipulation of the graphic appearance of a window in accordance with the method and system of the present invention. As above, this process begins at block 90, and thereafter passes to block 92. Block 92 illustrates a determination of whether or not the depth control icon has been selected and if not, the process merely iterates until such time as the depth control icon has been selected. Once the depth control icon has been selected, as determined at block 92, the process passes to block 94 which illustrates the display of the depth control window, as depicted within FIGS. 3, 4, and 5.

Next, the process passes to block 96 which illustrates a determination of whether or not a graphics control within the depth control window has been selected. If not, this process merely iterates until such time as a graphics control has been selected. Once a graphics control has been selected, the process passes to block 98 which illustrates the alteration of a selected window color and/or pattern in a manner determined by user inputs to the system. Those skilled in the art will appreciate that many different menu or selection techniques may be utilized to permit a user to alter a selected window's color and/or pattern, utilizing the graphics control provided within depth control window 40.

Upon reference to the foregoing those skilled in the art will appreciate that the method and system of the present invention provides an intuitive and graphic technique whereby a complex display of multiple applications within a plurality of overlapping windows may be efficiently and rapidly manipulated to provide the display of a particular application desired by the user.

While the invention has been particularly shown and described with reference to a preferred embodiment, it will be understood by those skilled in the art that various changes in form and detail may be made therein without departing from the spirit and scope of the invention.

I claim:

1. A graphic method for permitting access to any one of multiple windows displayed in a graphical user interface and which are relatively positioned in an order from a bottom position to a top position, said method comprising the steps of:

displaying a depth control object within said graphical user interface, said depth control object including a plurality of graphic elements arranged in said order, each of said plurality of graphic elements corresponding to one of said windows; and altering said display of said windows within said graphical user interface in response to a selection by a user of a particular one of said graphic elements within said depth control object to display a selected window corresponding to said particular one of said graphic elements and each window relatively positioned beneath said selected window.

2. The graphic method for permitting access to multiple windows according to claim 1, wherein said graphical user interface includes a graphic pointing device and wherein said step of altering said display of said windows in response to a selection by a user of a particular one of said graphic elements within said depth control object comprises the step of altering said display of said windows in response to a selection by a user of a particular one of said graphic elements within said depth control object utilizing said graphic pointing device.

3. The graphic method for permitting access to multiple windows according to claim 1, wherein said step of displaying a depth control object comprises the step of displaying a depth control window which includes a plurality of graphic elements arranged in said order, each of said plurality of graphic elements corresponding to one of said windows.

4. The graphic method for permitting access to multiple windows according to claim 3, wherein said step of displaying a depth control window which includes a plurality of graphic elements arranged in said order, each of said plurality of graphic elements corresponding to one of said windows comprises the step of displaying a depth control window which includes a plurality of title bars arranged in a vertical column in said order, each of said plurality of title bars corresponding to one of said windows.

5. The graphic method for permitting access to multiple windows according to claim 4, further including the step of displaying a numeric depth indicator in association with each of said plurality of title bars.

6. The graphic method for permitting multiple access to windows according to claim 3, wherein said step of displaying a depth control object further comprises the step of displaying a graphic control object within said depth control window, said graphic control object including graphics controls for permitting a user to alter the graphic appearance of a window within said graphical user interface.

7. A system for graphically manipulating the display of multiple windows within a data processing system which are displayed and relatively positioned in an order from a bottom position to a top position, said system comprising:

means for displaying a depth control object within said data processing system in response to a user input to said data processing system, said depth control object including a plurality of graphic elements arranged in said order, each of said plurality of graphic elements corresponding to one of said windows; and means for altering said display of said windows within said data processing system in response to a selection by a user of a particular one of said graphic elements within said depth control object to display a selected window corresponding to said particular one of said graphic elements and each window relatively positioned in the order beneath said selected window.

8. The system for graphically manipulating the display of multiple windows within a data processing system according to claim 7, wherein said data processing system includes a graphic pointing device and wherein said means for altering said display of said windows within said data processing system in response to a selection by a user of a particular one of said graphic elements within said depth control object comprises means for altering said display of said windows within said data processing system in response to a selection by a user of a particular one of said graphic elements within said depth control object utilizing said graphic pointing device.

9. The system for graphically manipulating the display of multiple windows within a data processing system according to claim 7, wherein said means for displaying a depth control object within said data processing system in response to a user input to said data processing system comprises means for displaying a depth control window which includes a plurality of graphic elements arranged in said order, each of said plurality of graphic elements corresponding to one of said windows.

10. The system for graphically manipulating the display of multiple windows within a data processing system according to claim 9, wherein means for displaying a depth control window which includes a plurality of graphic elements arranged in said order, each of said plurality of graphic elements corresponding to one of said windows comprises means for displaying a depth control window which includes a plurality of title bars arranged in a vertical column in said order, each of said plurality of title bars corresponding to one of said windows.

11. The system for graphically manipulating the display of multiple windows within a data processing system according to claim 10, further including means for displaying a numeric depth indicator in association with each of said plurality of title bars.

12. The system for graphically manipulating the display of multiple windows within a data processing system according to claim 9, wherein said means for displaying a depth control object within said data processing system further comprises means for displaying a graphic control object within said depth control window, said graphic control object including graphics controls for permitting a user to alter a graphic appearance of a window within said data processing system.

13. A method for providing an improved interface with a graphic user interface capable of displaying multiple overlapping representations of available objects within a data processing system, said method comprising the steps of:

determining a relative depth of each of said multiple overlapping representations of available objects within said data processing system;

displaying a window which includes a graphic indication of said relative depth of each of said multiple overlapping representations of available objects within said data processing system; and displaying a particular one of said multiple overlapping representations of available objects and each available object which is overlapped by said particular one of said multiple overlapping representations of available objects in response to a user selection of a graphic indication within said window.

14. The method for providing an improved interface with a graphic user interface according to claim 13, further including the step of dynamically altering said graphic indication of said relative depth of each of said multiple overlapping representations of available objects within said data processing system in response to an alteration of an available object within said data processing system.

15. A system for providing improved access to a selected one of a plurality of overlapping user manipulatable objects within a graphic user interface of a data processing system, said system comprising:

depth control means for displaying an ordered graphic indication of each of said plurality of overlapping user manipulatable objects;

graphic selection means for permitting a user to select a particular one of said ordered graphic indications within said depth control means;

display control means for altering a display within said data processing system to display a particular user manipulatable object associated with said particular one of said ordered graphic indications and each user manipulatable object underlying said particular user manipulatable object in response to a selection of said particular one of said ordered graphic indications within said depth control means.

16. The system for providing improved access to a selected one of a plurality of overlapping user manipulatable objects according to claim 15, further including means for altering said display of said ordered graphic indications of each of said plurality of overlapping user manipulatable objects within said depth control means in response to an alteration in status of any of said plurality of overlapping user manipulatable objects.

17. Computer readable code for indicating a hierarchy of windows in a graphical user interface and for permitting a user to navigate through the hierarchy of windows, comprising:

first subprocesses for displaying an object including a graphical representation of each window in the hierarchy; and second subprocesses for permitting the user to access a desired window by selecting the graphical representation corresponding to the desired window without changing the hierarchy.

18. Computer readable code for indicating a hierarchy according to claim 17, wherein said second subprocesses further causes the windows logically positioned above the desired window not to be displayed in the graphical user interface.

19. Computer readable code for indicating a hierarchy according to claim 17, wherein said first subprocesses further graphically indicates relative positions of each of the windows in the hierarchy.

20. Computer readable code for indicating a hierarchy according to claim 17, wherein the hierarchy is from a logical bottom most window to a logical top most window in the graphical user interface.

21. Computer readable code for indicating a hierarchy according to claim 17, wherein the hierarchy is from a logical bottom most window to a logical top most window in the hierarchy.

* * * * *